United States Patent [19]
Henze

[11] Patent Number: 4,761,725
[45] Date of Patent: Aug. 2, 1988

[54] DIGITALLY CONTROLLED A.C. TO D.C. POWER CONDITIONER

[75] Inventor: Christopher P. Henze, Eagan, Minn.

[73] Assignee: Unisys Corporation, Blue Bell, Pa.

[21] Appl. No.: 107,239

[22] Filed: Oct. 13, 1987

Related U.S. Application Data

[63] Continuation of Ser. No. 891,911, Aug. 1, 1986.

[51] Int. Cl.$^4$ .............................................. H02M 1/14
[52] U.S. Cl. .................................... 363/46; 323/241; 323/283
[58] Field of Search ................... 363/46; 323/241, 283

[56] References Cited

U.S. PATENT DOCUMENTS

| | | | |
|---|---|---|---|
| 3,761,797 | 9/1973 | Spooner | 363/46 |
| 4,109,194 | 8/1978 | Miller | 323/283 |
| 4,630,187 | 12/1986 | Henze | 363/41 |
| 4,680,689 | 7/1987 | Payne et al. | 363/26 |

FOREIGN PATENT DOCUMENTS 0892606 12/1979 U.S.S.R. ............................... 363/46

OTHER PUBLICATIONS

Heightman, "New Methods of Regulation for Stabilized Power Supplies", Marconi Review 21(130), 1958, pp. 110–130.
Edwards, "A New Offline Converter Topology Draws Sinusoidal Input Current", Proceeding of Powercon 11, F-4, pp. 1-5.
Mahadevan et al., "A Converter with Three Switched-Networks Improves Regulation, Dynamics, and Control", Powercon 10, E-1, pp. 1-19.
Chambers, "A New High Frequency Resonant Technique for Dynamic Correction of Offline Convert Input Current Waveforms", Powercon 10, F-1, pp. 1-7.
Edith Kamm, "New Military EMI Specifications Affecting the Input Circuit Architecture of AC to DC Converters", Proceedings of Powercon 8, Power Concepts, Inc. 1981, pp. 1-11.
Kocher and Steigerwald, "An AC to DC Converter with High Quality Input Waveforms" 1982, IEEE, pp. 63-75.
Keller & Baker, "Unity Power Factor Off Line Switching Power Supplies", 1984, IEEE, pp. 332-339.
Mohan, et al, "Sinusoidal Line Current Rectification with a 100 kHZ B-Sit Step-Up Converter", 1984 IEEE, pp. 92-98.

Primary Examiner—Patrick R. Salce
Assistant Examiner—Jeffrey Sterrett
Attorney, Agent, or Firm—Glenn W. Bowen; Laurence J. Marhoefer

[57] ABSTRACT

An A.C. to D.C. power conditioner, which draws sinusoidal input current utilizes digital proportional-integral control to provide output voltage regulation by adjusting the gain of a current program loop. The current program loop controls the state of a power switch to force the instantaneous average current in an inductor to follow the instantaneous rectified line voltage. Variable hysteresis control provides noise immunity by increasing the ripple current in an iron-cored filter inductor when the instantaneous input voltage is high. Digital proportional-integral (PI) control provides output voltage regulation by adjusting, in discrete steps, the gain of the current program loop. A multiplying digital-to-analog converter serves as an interface between the voltage regulation loop and the current program loop. The sampling rate of the PI controller is determined by the input line frequency, which allows good transient response to be obtained. The current program loop forces the current drawn by the power conditioner to follow the input A.C. line voltage, thereby electronically emulating a resistor.

22 Claims, 3 Drawing Sheets

DIGITALLY CONTROLLED A.C. TO D.C. POWER CONDITIONER

This application is a continuation of application Ser. No. 891,911, filed Aug. 1, 1986 in the name of Christopher P. Henze and assigned to the assignee of the present invention.

BACKGROUND OF THE INVENTION

Recently there has been an expanded interest in power conditioning equipment that draws sinusoidal input current from the A.C. line. This need is discussed in the articles by E. Kamm entitled "New Military EMI Specifications Affecting the Input Architecture of A.C. to D.C. Converters", *Proceedings of Powercon* 8, 1981, and by M. J. Kocher and R. L. Steigerwald entitled "An A.C. to D.C. Converter with High Quality Input Waveforms", *IEEE PESC Conference Record*, 1982. The present invention provides a digital implementation of a voltage feedback loop and a multiplying digital-to-analog converter in a current feedback loop to provide a power conditioner, which draws sinusoial output current and provides a regulated direct current output voltage and is operable over a wide range of A.C. line frequencies.

BRIEF DESCRIPTION OF THE DRAWINGS

The present invention is described by reference to the drawings in which:

FIG. 4 shows the switching frequency and inductor ripple current versus ($V_{in}/V_{out}$) plots for various converter conditions, where

TECHNICAL DESCRIPTION OF THE INVENTION

Noise generated by high speed switching can upset the operation of a current program loop in A.C. to D.C. power converters. Variable hysteresis control is employed in the present invention so that the highest noise immunity is provided when the switching energy (and therefore, the noise generation) is the greatest. Variable hysteresis control is employed in the present invention to control the inductor ripple current $I_{rip}$ in proportion to the instantaneous rectified input voltage $V_{in}$, where:

$$I_{rip} = K_{hy} V_{in} \quad (1)$$

The power converter utilizes a step-up converter which has a switching frequency that is much higher than the A.C. line frequency. Steady-state operation may, therefore, be assumed in the step-up converter for any average instantaneous input voltage. Using Equation 1 and the approximations:

$$t_{on} = \frac{L_1 I_{rip}}{V_{in}} \quad t_{off} = \frac{L_1 I_{rip}}{V_{out} - V_{in}} \quad (2,3)$$

an expression for the switching frequency $f_{sw}$ may be found in terms of the current hysteresis coefficient $K_{hy}$, the step-up converter inductance $L_1$, and the input and output voltages $$f_{sw} = \frac{V_{out} - V_{in}}{K_{hy} L_1 V_{out}} \quad (4)$$

The maximum switching frequency, which occurs when the input voltage goes to zero, is bounded and is given by $$f_{sw,max} = (K_{hy} L_1)^{-1} \quad (5)$$

In practice, the maximum switching frequency will not be obtained since a real step-up converter is unable to maintain an output voltage as the input voltage and duty ratio approach zero.

Figure 1:
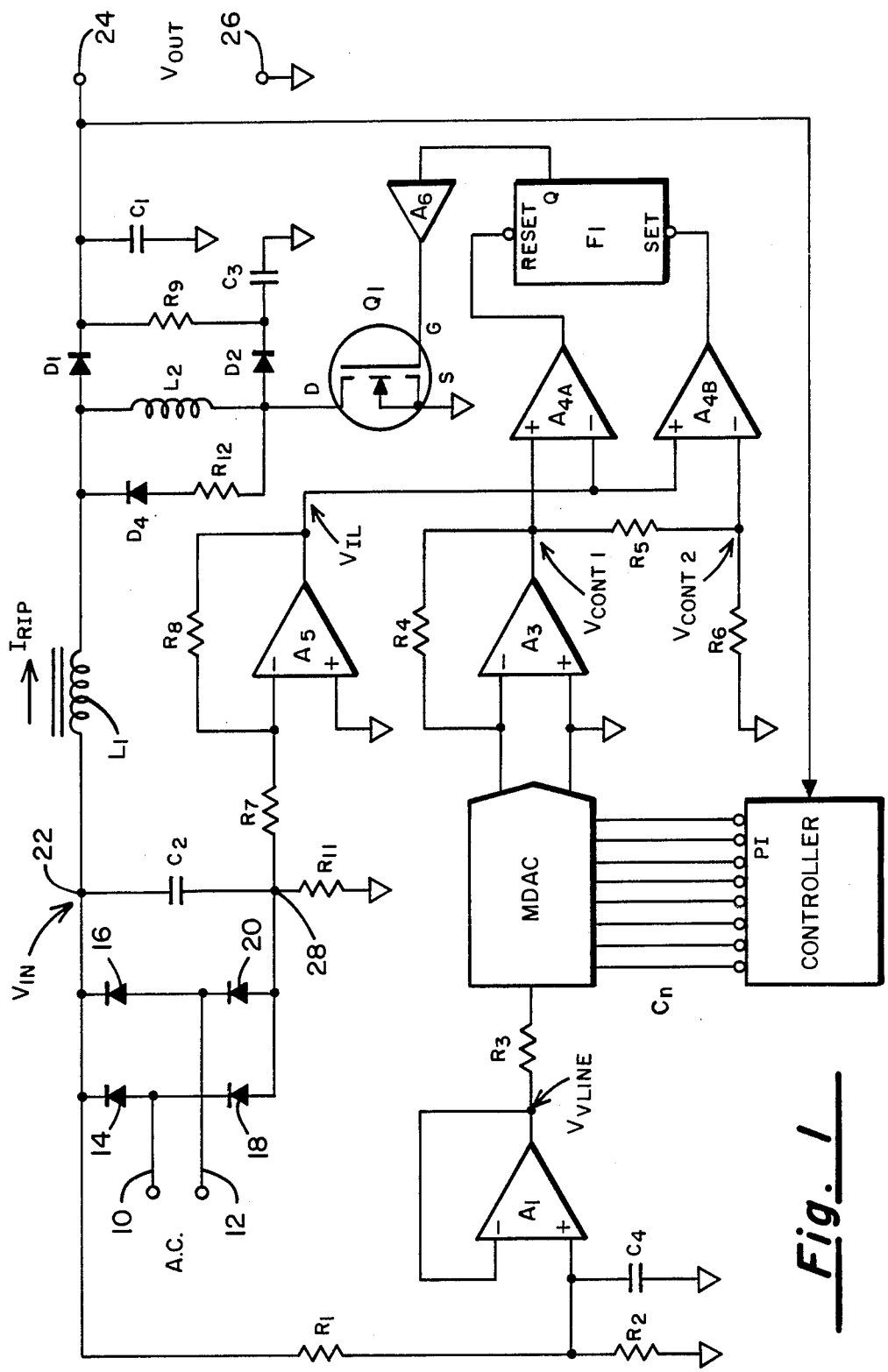
FIG. 1 shows a block diagram of the digitally controlled power conditioner of the present invention.

The circuit of FIG. 1 can be used to implement the variable hysteresis current program loop of the present invention. The A.C. input line voltage is connected across the lines 10, 12 to a full wave rectifying circuit consisting of the rectifiers 14, 16, 18 and 20. The rectified output which is labeled $V_{in}$ appears at the junction node 22 of a high-permeability core of soft iron, or other suitable material that has magnetic hysteresis characteristics and filter inductor $L_1$ which is coupled between the node 22 and the output terminal 24 and a capacitor $C_2$, which has a relatively small value compared to the filter capacitor $C_1$. $C_2$ is used to by pass the A.C. line so the ripple current in the inductance $L_1$ flows through $C_2$, and not back through the A.C. power system. The output voltage $V_{out}$ is developed across the output terminals 24, 26, the inductance $L_1$, the diode $D_1$, the capacitor $C_1$ and the transistor $Q_1$ form a step up or boost converter. The diodes $D_2$ and $D_4$, the capacitor $C_3$ and the resistors $R_9$ and $R_{12}$ form a snubber circuit for reducing switching transients on the power transistor $Q_1$.

A diode $D_4$ is in series with the resistor $R_{12}$. $R_{12}$ is coupled to the junction point of the inductor $L_2$ and the anode of the diode $D_2$ and the drain D of the field-effect power transistor $Q_1$. The source S of the field-effect transistor $Q_1$ is grounded. The gate G of the field-effect transistor $Q_1$ receives the output of the amplifier $A_6$. The amplifier $A_6$ supplies a logic "1" and a logic "0" to the transistor $Q_1$ so that it acts as a switch under control of the flip-flop $F_1$ to provide step-up conversion.

The node 22 is also coupled to a voltage dividing network consisting of the resistors $R_1$ and $R_2$ is coupled to a filtering capacitor $C_4$. The junction point of $R_2$ and $C_4$ is coupled to the non-inverting input terminal of operational amplifier $A_1$ which is connected so that its inverting input terminal is directly connected to its output so that the amplifier $A_1$ acts as a voltage follower. The output of the amplifier $A_1$ is coupled through the resistor $R_3$ to a muliplying digital-to-analog converter (MDAC). The MDAC is supplied a gain signal $c_n$ from the PI controller which has an input coupled to the output terminal 24. The resistor $R_3$ is coupled to the MDAC controller and receives the voltage $V_{LINE}$ from the amplifier $A_1$. Under the control of the gain signal from the PI controller, the gain-controlled analog output signal of the MDAC is supplied to the inverting input terminal of the amplifier $A_3$. The amplifier $A_3$ also has a feedback resistor $R_4$ coupled between its output and its inverting input terminal. The output of the amplifier $A_3$ is coupled to the voltage-dividing network consisting of the resistors $R_5$ and $R_6$ to the inverting input terminal, one side of a dual comparator $A_{4B}$. The other side of the inverting comparator $A_{4A}$ is coupled to receive the output from the amlpifier $A_3$ on its non-inverting input terminal.

The lower end of the capacitor $C_2$ is coupled to a junction of the resistor $R_7$ and the resistor $R_{11}$, the other end of which is grounded. The signal obtained at the junction node 28 of these two resistors is coupled through the resistor $R_7$ to the inverting input terminal of an amplifier $A_5$. The amplifier $A_5$ has a feedback resistor from its output to its inverting input terminal. The output of the amplifier $A_5$ is connected to the inverting input terminal of the comparator $A_{4A}$ and also to the non-inverting input terminal of comparator $A_{4B}$. The outputs of the comparators $A_{4A}$ and $A_{4B}$ are coupled to the clear and the set terminals of the flip-flop $F_1$ respectively.

In operation, the 8 bit multiplying digital-to-analog convertor (MDAC) multiplies a reference voltage $V_{LINE}$ (that is proportional to the instantaneous input voltage) by the quantized current gain value $c_n$ supplied from the proportional-integral (PI) controller in the voltage regulation loop to provide an upper (or "turn-off") control voltage $V_{cont1}$. The resistive voltage division provided by R5 and R6 supplies a lower (or "turn-on") control voltage $V_{cont2}$. The current flowing through the inductor $L_1$ is measured using a small, (on the order of 0.1 Ohm) resistor $R_2$.

Figure 2:
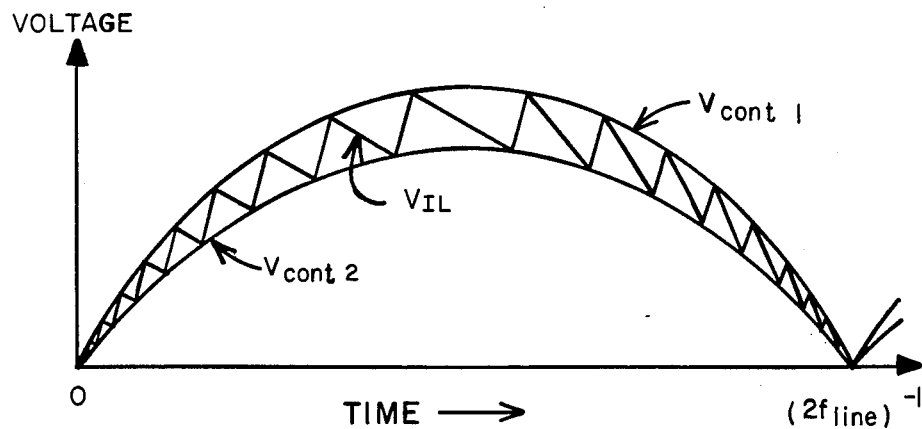
FIG. 2 shows the control voltage waveforms of the current program loop during one half cycle of the A.C. line.

The amplifier $A_5$ provides a voltage $V_{IL}$, which is proportional to the instantaneous inductor current through $L_1$ to the inverting input terminal of the turn-on comparator $A_{4B}$ and to the non-inverting input terminal of the turn-off comparator $A_{4A}$. An S-R flip-flop $F_1$ is toggled by the comparators to turn through an amplifier $A_6$ the field-effect transistor switch $Q_1$, which acts as the output stage of the step-up converter, ON and OFF. The time relationships between $V_{IL}$, and $V_{cont1}$, and $V_{cont2}$ for one-half cycle of the input A.C. line is shown in FIG. 2. The differences between the voltage $V_{IL}$ and $V_{cont1}$ controls the state of the flip-flop $F_1$, which controls the field-effect transistor $Q_1$.

Transfer functions describing the gain of the current program loop and the current hysteresis coefficient in terms of the quantized current gain value $c_n$ and the input voltage $v_{in}$ are useful for further analysis. The instantaneous voltages driving comparators $A_{4B}$ and $A_{4A}$ are related to the input voltage and inductor current through $$\frac{V_{cont1}(t)}{V_{in}(t)} = \frac{R_2 R_4}{(R_1 + R_2)R_3} \frac{c_n}{2^m} \quad (6)$$

$$\frac{V_{cont2}(t)}{V_{cont1}(t)} = \frac{R_6}{R_5 + R_6} \quad (7)$$

$$\frac{V_{IL}(t)}{I_{L1}(t)} = \frac{R_{11} R_8}{R_7} \quad (8)$$

where m is the number of bits used to represent the quantized current gain value $c_n$ and (t) indicates an instantaneous value. During steady-state operation, the average value of the upper and lower control voltages will be equal to the voltage representing the inductor current $$\frac{V_{cont1} + V_{cont2}}{2} = V_{IL} \quad (9)$$

The gain of the current program loop may be expressed as a function of the quantized current gain value $$\frac{I_L(t)}{V_{in}(t)} = \frac{R_2 R_4 R_7 (0.5 R_5 + R_6)}{(R_1 + R_2) R_3 (R_5 + R_6) R_8 R_{11}} \cdot \frac{c_n}{2^m} \quad (10)$$

The difference between the upper and lower control voltages, when multiplied by the voltage-to-current gain of Equation 8, determines the inductor ripple current $$K_{hy} = \frac{I_{rip}(t)}{V_{in}(t)} = \frac{R_2 R_4 R_5 R_7}{(R_1 + R_2) R_3 (R_5 + R_6) R_{11} R_8} \cdot \frac{c_n}{2^m} \quad (11)$$

The selection of the value of the capacitor $C_2$ is a critical aspect of the design of the unity power factor power conditioner. The capacitor conducts the ripple current directly to the shunt resistor, bypassing the A.C. line. If the capacitor is large and if there is no delay between the instant that the inductor current reaches a threshold and the instant that the power transistor $Q_1$ actually switches states, the current program loop will be unconditionally stable. However, if the value of the capacitor $C_2$ is too large, unacceptable harmonic distortion will be produced in the A.C. line current.

Figure 3:
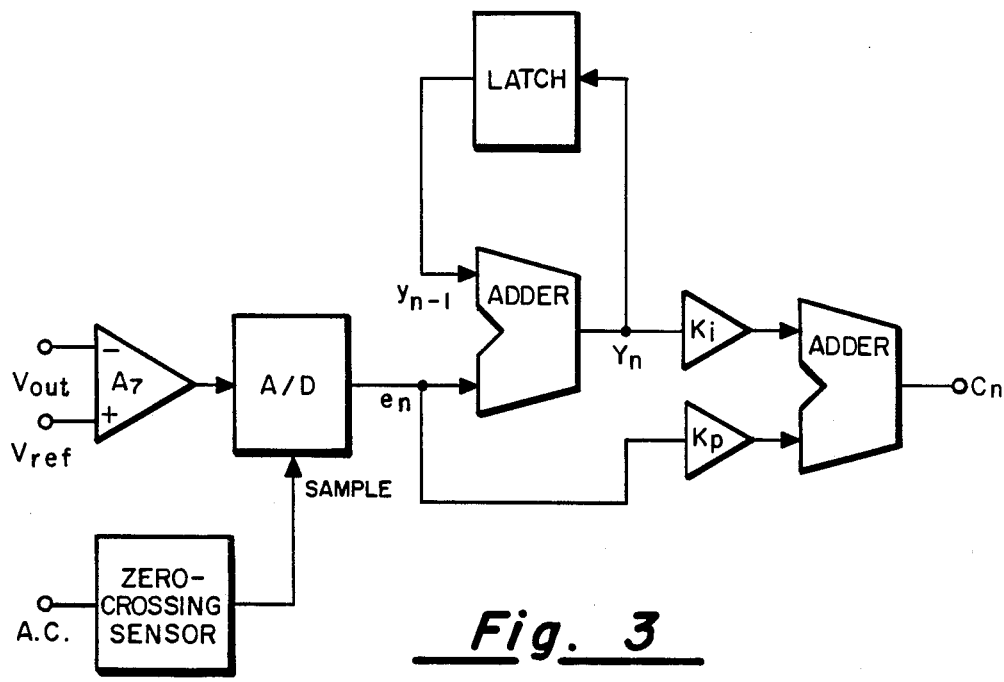
FIG. 3 shows a block diagram of a digital PI controller which determines the gain to be used by the current program loop during the next half cycle of the A.C. line from a digital error signal and the discrete integral of the digital error signal.
Figure 4A:
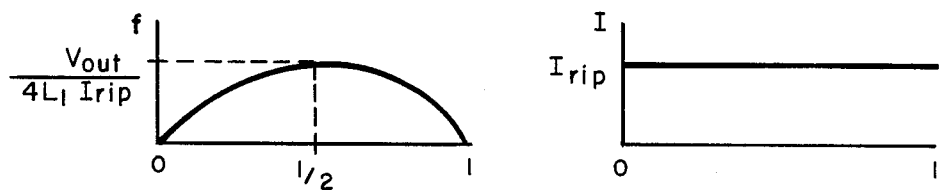
FIG. 4a is for constant current hysteresis control.
Figure 4B:
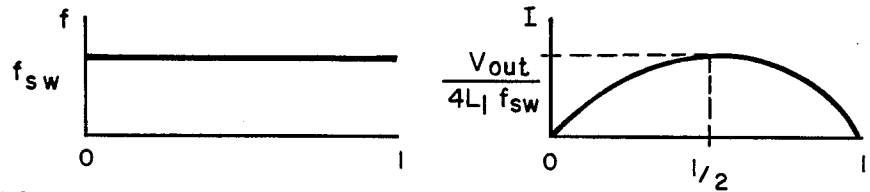
FIG. 4b is for constant switching frequency control.
Figure 4C:
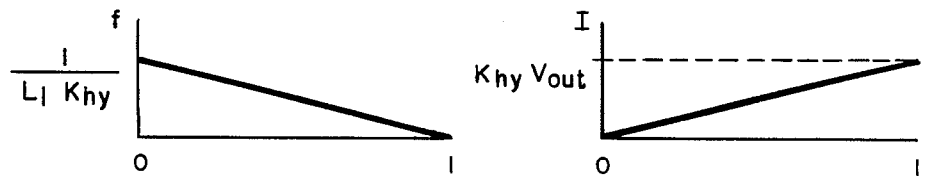
FIG. 4c is for variable current hysteresis control.
Figure 4D:
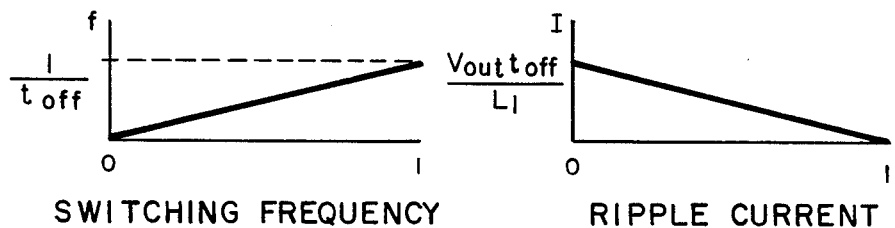
FIG. 4d is for constant off-time control.

A digital proportional-integral (PI) control may be implemented as shown in FIG. 3, and used for output voltage regulation and current gain control in accordance with the present invention. A digital error circuit consisting of an uncompensated analog amplifier $A_7$ and an anglog-to-digital (A/D) converter, samples and digitizes the error in the output voltage at the sensing of each zero-crossing of the A.C. line with a conventional zero-crossing circuit to produce a digital error signal $e_n$. Sampling at the zero-crossing is advantageous since the average output voltage (to a close approximation) is measured, regardless of the magnitude of the ripple component. Furthermore, sampling at the zero-crossings insures that no information will be obtained at the ripple frequency. This prevents the voltage regulation loop from distorting the A.C. line current waveform in an attempt to reduce the output voltage ripple.

The digital output signal from the digital PI controller adjusts, in discrete steps, the gain of the current program loop, and is therefore termed the quantized current gain value. The quantized current gain value is restricted to the $2^m$ integer values which may be represented by an m-bit digital word. As an example, if an 8 bit binary representation is used the digital PI controller, the decimal representation of the quantized current gain value $c_n$ may range from 0 to 255. Since a hardware realization is used, the calculation updating the quantized current gain value is completed during the zero-crossings of the A.C. line.

The digital error signal $e_n$ describes the difference between the actual output voltage of the power conditioner at the nth zero-crossing of the A.C. line and a reference voltage $V_{ref}$. As an example, if an 8 bit two's complement representation is used in the digital PI controller, the decimal representation of $e_n$ may range from $-128$ to $+127$.

The quantized current gain value $c_n$ is calculated from the weighted summation of two digital signals. The first digital signal is proportional to the digital error input $e_n$. The second digital signal $y_n$ is obtained from the discrete integration of the digital error input $e_n$. Discrete integration is accomplished using an adder and a register to maintain a continuous summation of the digital error input.

$$y_n = e_0 + e_1 + \ldots + e_n \qquad (12)$$

A discrete time difference equation may be written $$y_n = y_{n-1} + e_n \qquad (13)$$

where $y_{n-1}$ is the stored digital value in the latch which was obtained from the sample prior to the one which yielded the $y_n$ signal. Weighting coefficients $K_p$ and $K_i$ are provided to adjust the contribution of the proportional and integral signals to the current gain value calculation, respectively, $$c_n = K_i y_n + K_p e_n \qquad (14)$$

Overflow detection and correction may be implemented in a conventional manner at the outputs of both adders to prevent erroneous operation.

In general, $K_p$ and $K_i$ can take on any value. In the preferred system however, $K_p$ is restricted to unity and $K_i$ may take on the values: 2, 1, $\frac{1}{2}$, $\frac{1}{4}$. This is because digital multiplication or division by powers of two is simply implemented, and because the gain of the digital error amplifier may be used to adjust the overall loop gain.

A PID controller which may be utilized to implement the PI control of the present invention is shown in U.S. patent application, Ser. No. 773,684, now U.S. Pat. No. 4,630,187, Power Converter with Duty Ratio Quantization, Filed Sept. 9, 1985, which is hereby incorporated by reference into this document.

In order to maintain a unity power factor, the closed-loop frequency response of the output voltage regulation loop must cross through unity gain at a frequency which is less than the frequency of the ripple in the output voltage. If this condition is not met, the output voltage regulation loop will distort the input current waveform in an effort to reduce the output ripple voltage. The digitally controlled power converter of the present invention may alternately accept a quantized current gain value from an external source, allowing open-loop operation.

A high performance A.C. to D.C. power conditioner is disclosed which uses digital proportional-integral control for output voltage regulation and variable hysteresis control for current programming. A digitally controlled analog converter (i.e., a multiplying digital-to-analog controller—MDAC) is used as the interface between the voltage regulation loop and the current program loop.

The sampling instant of the digital PI controller is determined by the zero-crossings of the A.C line. This scales the frequency characteristics of the closed-loop system with changes in the A.C. line frequency. Power conditioners for different A.C. line frequencies may be implemented with the power conditioner of the present invention since only the output capacitor must be changed to take advantage of the improved dynamic characteristics offered by a higher line frequency. On-the-other-hand, if a single power conditioner is required to operate over a wide range of A.C. line frequencies, modifications are required to insure that proper operation is retained. This may be accomplished by including circuitry to automatically alter the proportional and integral weighting coefficients as different line frequencies are encountered.

Another approach is to mask some of the zero-crossings when operating at higher line frequencies to maintain a nearly constant sampling rate. Providing an internal clock to determine the sampling instances if zero-crossings are not detected would allow the power conditioner to operate from D.C. as well as A.C. power sources. Care must be taken, however, since the loop gain varies with both magnitude and shape of the input voltage waveform.

The digital control technique of the present invention is also well suited for three-phase applications since precise current balancing is easily obtained. A single PI controller and three step-up converters (with isolated D.C. to D.C. output stages) are required for a three-phase system. The digital quantized current gain control signal may be delivered to each step-up converter, without any loss of accuracy, using, for example, digital optical couplers.

Various control functions may be implemented via the PI controller to develop switching control waveforms for the current program loop. For example, these control laws may include: constant switching frequency control, constant current hysteresis control, constant off-time control, and variable current hysteresis control. Switching frequency and inductor ripple current are plotted against the normalized input voltage for each of the control functions in FIG. 4 and derivations are given below using the symbols defined in FIG. 1. (It is assumed that the step-up converter is ideal and operating in steady-state in these derivations.)

Constant Frequency Control. Since the switching frequency is constant, the sum of the on-time and the off-time of the switch much also be constant $$t_{on} + t_{off} = 1/f_{sw} = \text{constant} \qquad (15)$$

Assuming that the input and output voltages are constant over the duration of the switching cycle and using $$V = L_1 \frac{di}{dt} \qquad (16)$$

the on-time and off-time may be expressed as $$t_{on} = \frac{L_1 I_{rip}}{V_{in}} \qquad (17)$$

$$t_{off} = \frac{L_1 I_{rip}}{V_{out} - V_{in}} \qquad (18)$$

By substituting Equations 17 and 18 into Equation 15, an expression for the ripple current is obtained.

$$I_{rip} = \frac{V_{in}(V_{out} - V_{in})}{f_{sw} L_1 V_{out}} \qquad (19)$$

It is noted that the ripple current goes to zero when the input voltage is equal to zero and also when the input voltage is equal to the output voltage. The maximum ripple current may be found by setting the derivative of Equation 19, with respect to the input voltage, equal to zero.

$$\frac{dI_{rip}}{dV_{in}} = 0 \text{ when } I_{rip} = I_{rip,max} \quad (20)$$

$$I_{rip,max} = \frac{V_{out}}{4f_{sw}L_1} \text{ when } V_{in} = \frac{V_{out}}{2} \quad (21)$$

Constant Hysteresis Control. By definition, the ripple current will be constant. Using Equations 17 and 18, Equation 15 may be solved for the switching frequency $$t_{on} + t_{off} = \frac{1}{f_{sw}} = \frac{L_1 I_{rip}}{V_{in}} + \frac{L_1 I_{rip}}{V_{out} - V_{in}} \quad (22)$$

$$f_{sw} = \frac{V_{in}(V_{out} - V_{in})}{I_{rip} L_1 V_{out}} \quad (23)$$

The switching frequency goes to zero as the input voltage goes to zero and when the input voltage is equal to the output voltage. The maximum switching frequency may be found by setting the derivative of Equation 23, with respect to the input voltage, equal to zero.

$$f_{sw,max} = \frac{V_{out}}{4L_1 I_{rip}} \text{ when } V_{in} = \frac{V_{out}}{2} \quad (24)$$

Constant Off-Time Control. Since the off-time is constant, the on-time may be expressed as $$t_{on} = T_{sw} - t_{off} \quad (25)$$

where $T_{sw} = 1/f_{sw}$.

During steady-state operation, the static voltage transfer function for the step-up converter is $$\frac{V_{out}}{V_{in}} = \frac{1}{1 - D} \quad (26)$$

where D is the duty ratio of the power switching transistor. Since the duty ratio is defined as the on-time divided by the switching period $T_{sw}$, Equation 26 may be rewritten as $$\frac{V_{in}}{V_{out}} = 1 - \frac{t_{on}}{T_{sw}} \quad (27)$$

By combining Equations 25 and 27, the switching frequency may be solved for $$f_{sw} = \frac{V_{in}}{V_{out}} \cdot \frac{1}{t_{off}} \quad (28)$$

The ripple current is found directly from Equation 118

$$I_{rip} = \frac{t_{off}}{L_1}(V_{out} - V_{in}) \quad (29)$$

Variable Hysteresis Control. Expressions for the switching frequency and ripple current as a function of the input and output voltages are given in Equations 1 and 4. However, it is interesting to note that Equations 1 and 2 may be combined to show $$t_{on} = K_{hy} L_1 = \text{constant} \quad (30)$$

Therefore, variable hysteresis control may also be described as constant on-time control.

What is claimed is:

1. In a power conditioner for providing a D.C. output voltage from a rectified A.C. input voltage source which comprises switching means and an inductor, through which inductor current comprising ripple current flows, and which is coupled between said input voltage source and said switching means, the improvement comprising means for supplying a reference voltage, current control means comprising said switching means for varying the magnitude of the peak-to-peak value of said ripple current and the instantaneous average value of said inductor current in proportion to the instantaneous magnitude of said rectified A.C. input voltage, comparison means for comparing said output voltage and said reference voltage, and for supplying an analog error signal representative of the difference of said output voltage and said reference voltage, and analog-to-digital converter means coupled to said comparison means for receiving said analog error signal, and for providing a digital error signal to said switching means for altering the switching frequency of said switching means as a function of said digital error signal.

2. In a power conditioner as claimed in claim 1, the further improvement wherein said current control means comprises a proportional integral controller which receives said digital error signal and produces a digital control signal to said switching means for controlling the switching frequency of said switching means.

3. In a power conditioner as claimed in claim 1, the further improvement wherein said switching means comprises switchable current path means for diverting current from said inductor, regulating means coupled to said comparison means for receiving said rectified A.C. input voltage and said digital control signal and for providing a turn-on signal and a turn-off signal, both of which have substantially the waveform as said rectified A.C. input signal, but are of different amplitudes, measuring means coupled to said inductor for providing a current signal representative of the instantaneous current flowing in said inductor, and on-off means coupled to said regulating means and to said measuring means for controlling the switching of said switchable current path means in response to said current signal and said turn-on and turn-off signals.

4. In a power conditioner as claimed in claim 3, the further improvement wherein said current control means comprises a proportional integral controller which receives said digital error signal and produces a digital control signal to said switching means for controlling the switching frequency of said switching means.

5. In a power conditioner as claimed in claim 3, the further improvement wherein said analog-to-digital converter means is a sampling converter and said power conditioner comprises sample control means coupled to receive the A.C. input signal for supplying a sampling signal to said sampling converter upon each zero crossing of the A.C. input voltage.

6. In a power conditioner as claimed in claim 5, the further improvement wherein said current control means comprises a proportional integral controller which receives said digital error signal and produces a digital control signal to said switching means for controlling the switching frequency of said switching means.

7. In a power conditioner as claimed in claim 1, the further improvement wherein said analog-to-digital converter means is a sampling converter and said power conditioner comprises sample control means coupled to receive the A.C. input signal for supplying a sampling signal to said sampling converter upon each zero crossing of the A.C. input voltage.

8. In a power conditioner as claimed in claim 7, the further improvement wherein said control means comprises a proportional integral controller which receives said digital error signal and produces a digital control signal to said switching means for controlling the switching frequency of said switching means.

9. In a power conditioner as claimed in claim 1 the improvement wherein said current control means controls said inductor current such that said power conditioner draws a substantially sinusoidal input current.

10. In a power conditioner as claimed in claim 9, the further improvement wherein said current control means comprises a proportional integral controller which receives said digital error signal and produces a digital control signal to said switching means for controlling the switching frequency of said switching means.

11. In a power conditioner as claimed in claim 9, the further improvement wherein said analog-to-digital converter means is a sampling converter and said power conditioner comprises sample control means coupled to receive the A.C. input signal for supplying a sampling signal to said sampling converter upon each zero crossing of the A.C. input voltage.

12. In a power conditioner as claimed in claim 11, the further improvement wherein said current control means comprises a proportional integral controller which receives said digital error signal and produces a digital control signal to said switching means for controlling the switching frequency of said switching means.

13. In a power conditioner as claimed in claim 9, the further improvement wherein said switching means comprises switchable current path means for diverting current from said inductor, regulating means coupled to said comparison means for receiving said rectified A.C. input voltage and said digital control signal and for providing a turn-on signal and a turn-off signal, both of which have substantially the waveform as said rectified A.C. input signal, but are of different amplitudes, measuring means coupled to said inductor for providing a current signal representative of the instantaneous current flowing in said inductor, and on-off means coupled to said regulating means and to said measuring means for controlling the switching of said switchable current path means in response to said current signal and said turn-on and turn-off signals.

14. In a power conditioner as claimed in claim 13, the further improvement wherein said current control means comprises a proportional integral controller which receives said digital error signal and produces a digital control signal to said switching means for controlling the switching frequency of said switching means.

15. In a power conditioner as claimed in claim 13, the further improvement wherein said analog-to-digital converter means is a sampling converter and said power conditioner comprises sample control means coupled to receive the A.C. input signal for supplying a sampling signal to said sampling converter upon each zero crossing of the A.C. input voltage.

16. In a power conditioner as claimed in claim 15, the further improvement wherein said current control means comprises a proportional integral controller which receives said digital error signal and produces a digital control signal to said switching means for controlling the switching frequency of said switching means.

17. In a power conditioner for providing a D.C. output voltage from a rectified A.C. input voltage source which comprises switching means and an inductor, through which ripple current flows, and which is coupled between said input voltage source and said switching means, the improvement comprising means for supplying a reference voltage, current control means comprising said switching means for varying the magnitude of the peak-to-peak value of said ripple current and the instantaneous average value of said inductor current as a function of the switching frequency of said switching means, comparison means for comparing said output voltage and said reference voltage and for suppying an analog error signal representative of the difference of said output voltage and said reference voltage, analog-to-digital converter means coupled to said comparison means for receiving said analog error signal and for producing a digital error signal and proportional integral controller means coupled to receive said digital error signal for providing a digital control signal in response thereto and to said switching means for altering the switching frequency of said switching means as a function of said digital error signal.

18. In a power conditioner as claimed in claim 17, the further improvement wherein said analog-to-digital converter means is a sampling converter and said power conditioner comprises sample control means coupled to receive the A.C. input signal for supplying a sampling signal to said sampling converter upon each zero crossing of the A.C. input voltage.

19. In a power conditioner as claimed in claim 17, the further improvement wherein said switching means comprises switchable current path means for diverting current from said inductor, regulating means coupled to said comparison means for receiving said rectified A.C. input voltage and said digital control signal and for providing a turn-on signal and a turn-off signal, both of which have substantially the waveform as said rectified A.C. input signal, but are of different amplitudes, measuring means coupled to said inductor for providing a current signal representative of the instantaneous current flowing in said inductor, and on-off means coupled to said regulating means and to said measuring means for controlling the switching of said switchable current path means in response to said current signal and said turn-on and turn-off signals.

20. In a power conditioner as claimed in claim 19, the further improvement wherein said analog-to-digital converter means is a sampling converter and said power conditioner comprises sample control means coupled to receive the A.C. input signal for supplying a sampling signal to said sampling converter upon each zero crossing of the A.C. input voltage.

21. In a power conditioner as claimed in claim 19 the improvement wherein said current control means controls said inductor current such that said power conditioner draws a substantially sinusoidal input current.

22. In a power conditioner as claimed in claim 21, the further improvement wherein said analog-to-digital converter means is a sampling converter and said power conditioner comprises sample control means coupled to receive the A.C. input signal for supplying a sampling signal to said sampling converter upon each zero crossing of the A.C. input voltage.

* * * * *

UNITED STATES PATENT AND TRADEMARK OFFICE
CERTIFICATE OF CORRECTION

PATENT NO. : 4,761,725

DATED : August 2, 1988

INVENTOR(S) : Christopher P. Henze

It is certified that error appears in the above-identified patent and that said Letters Patent is hereby corrected as shown below:

Column 2, line 55, after "$R_2$" insert -- . $R_2$ --.

Signed and Sealed this

Third Day of January, 1989

Attest:

DONALD J. QUIGG

*Attesting Officer*     *Commissioner of Patents and Trademarks*